(No Model.)

S. S. WHEELER.
BRUSH CARRIER FOR DYNAMO ELECTRIC MACHINES.

No. 575,918. Patented Jan. 26, 1897.

Witnesses:
G. W. Balch
Hy. H. Whitman

Inventor,
Schuyler S. Wheeler,
by Thomas Ewing Jr.
Attorney.

UNITED STATES PATENT OFFICE.

SCHUYLER S. WHEELER, OF NEW YORK, N. Y., ASSIGNOR TO THE CROCKER-WHEELER ELECTRIC COMPANY, OF NEW JERSEY.

BRUSH-CARRIER FOR DYNAMO-ELECTRIC MACHINES.

SPECIFICATION forming part of Letters Patent No. 575,918, dated January 26, 1897.

Application filed May 26, 1896. Serial No. 593,160. (No model.)

*To all whom it may concern:*

Be it known that I, SCHUYLER S. WHEELER, a citizen of the United States of America, residing in the city, county, and State of New York, have invented certain new and useful Improvements in Brush-Carriers for Dynamo-Electric Machines, of which the following is a specification.

My invention relates to a means of mounting the brushes of a dynamo-electric machine so that the lines of contact are visible, the brushes easily removable, and that the connecting-cables may be dispensed with and the brushes can be simultaneously thrown off from or onto the commutator. In order to effect this, I mount the brushes on two rings insulated from each other and mounted on the frame of the machine at the inner end of the commutator, and carriers on the rings extending over the commutator, on which the brushes are mounted. I also provide means for moving the rings around to set the brushes and a system of connecting-rods to lift all the brushes at once. The two ends of each of these connecting-rods are separate pieces of metal adjustably united by a turnbuckle of insulating material.

Figure 1:
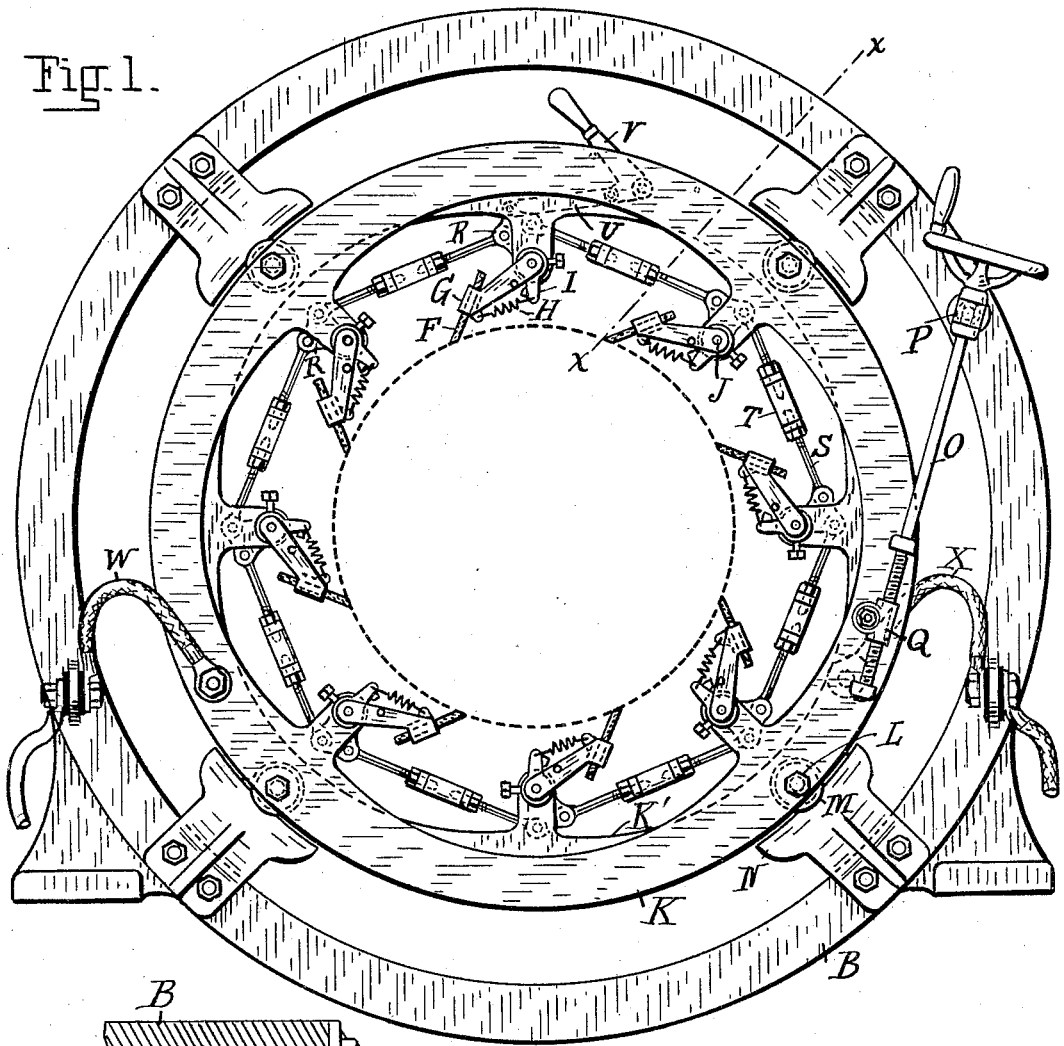
Figure 2:
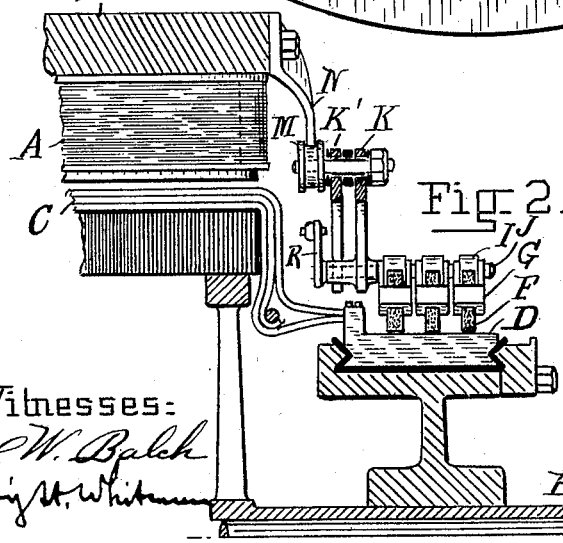

In the accompanying drawings, which form a part of this specification, Figure 1 is a front or end view showing the outer casing of a multipolar dynamo-electric machine with my improved mounting for the brushes attached thereto. Fig. 2 is a sectional view taken on the line $x$ $x$ of Fig. 1 and showing a portion of the casing, field-coils, armature, commutator, and brush-holders.

The dynamo-electric machine in connection with which the improved brush-carrier is illustrated is a multipolar machine in which the fields A are supported from an iron band B, which is the main part of the frame of the machine. The armature C and its commutator D are carried by a shaft E, the bearings of which are not shown. The brushes F are supported by brush-carriers in the usual way. They are fastened in brush-holders G. These holders are each connected by springs H to clamps I, attached to studs J. The brush-holders are mounted loosely on the studs and the brushes are drawn down against the commutator by the springs between the holders and the clamps. Each stud may carry one brush-holder or several groups of holders, as shown. The brushes are in two groups alternating with each other. All the brushes in one group collect, from the commutator, current of the same potential and one polarity. The two groups of course collect current of opposite polarity and hence must be insulated from each other.

Two carrier-rings K K' carry the studs on which the brushes are mounted. One of the rings carries the studs for the brushes in one group and the other carries the studs for the brushes in the other group. These rings are bolted together by bolts L, but are insulated from each other by insulating sleeves and washers. Grooved rollers M are attached to the bolts and engage with guides N, which are bolted to the ring carrying the field-coils of the machine. A shifting screw O is journaled near its head in an eye mounted on the band or part of the frame B which carries the fields. This shifting screw screws into a nut Q, which is mounted on one of the carrier-rings. By turning this screw the rings are revolved and all the brushes are simultaneously moved around the commutator.

The studs J, carrying the brush-holders, are journaled in projections from the carriers K K'. Attached to these studs are levers R. These levers are all joined together by connecting-rods S. All the studs may therefore be revolved simultaneously in their journals. If they are revolved to the right, the clamps contact with the brush-holders and lift the brushes from the commutator. Each of the connecting-rods is divided at the middle and the ends threaded oppositely and screwed into hard-wood blocks T, which serve as turnbuckles to adjust the length and to insulate the ends from each other. A toggle-link U connects one of the levers to the hard toggle-lever V, by which the studs are revolved and the brushes lifted from or put on the commutator.

The current received on the brushes collects on the carrier-rings and is conducted from these through the feeders W X.

Having now described my invention, what I claim, and desire to secure by Letters Patent of the United States, is—

1. In a dynamo-electric machine, the combination of rings insulated from each other and mounted on the frame of the machine at the inner end of the commutator, brush-carriers on the rings extending over the commutator, and brushes mounted on the carriers, substantially as described.

2. In a dynamo-electric machine, the combination of rings insulated from each other and mounted on the frame of the machine at the inner end of the commutator, brush-carriers on the rings extending over the commutator, brushes mounted on the carriers, and means for moving the rings around to set the brushes, substantially as described.

3. In a dynamo-electric machine, the combination of rings insulated from each other and mounted on the frame of the machine at the inner end of the commutator, brush-carriers on the rings extending over the commutator, brushes mounted on the carriers, means for moving the rings around to set the brushes, and means for lifting all of the brushes at once, substantially as described.

4. In a dynamo-electric machine the combination of brush-carriers, brushes mounted on the carriers, supports in which the brush-carriers are journaled, levers attached to the brush-carriers, and connecting-rods between the levers, the two ends of each connecting-rod being of separate pieces of metal united by a turnbuckle of insulating material, substantially as described.

5. In a dynamo-electric machine the combination of rings insulated from each other and mounted on the frame of the armature at the inner end of the commutator, brush-carriers on the rings extending over the commutator-brushes mounted on the carriers, levers attached to the brush-carriers and connecting-rods between the levers, the two ends of each connecting-rod being of separate pieces of metal, united by a turnbuckle of insulating material, substantially as described.

Signed by me, in New York city, this 25th day of May, 1896.

SCHUYLER S. WHEELER.

Witnesses:
BELLE J. HAMILTON,
A. L. DOREMUS.